J. C. MOORE.
AUTOMOBILE HEADLIGHT AND MOUNTING THEREFOR.
APPLICATION FILED AUG. 25, 1915.
1,195,383.
Patented Aug. 22, 1916.
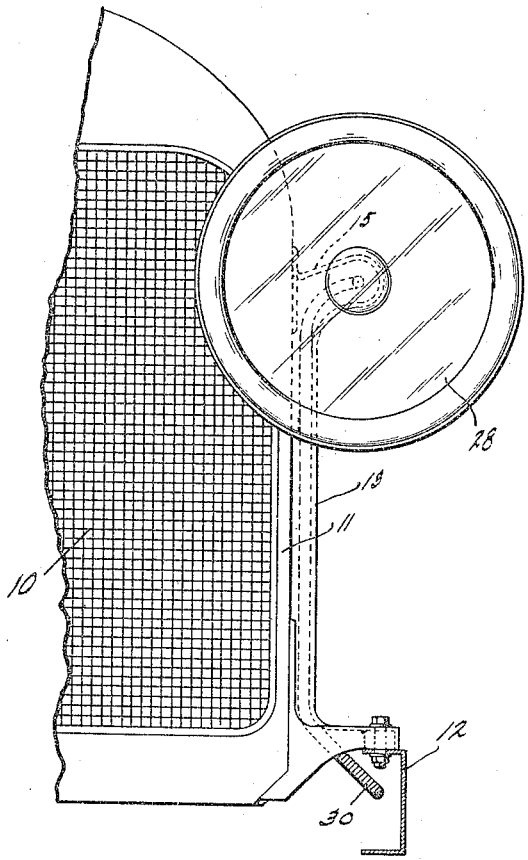
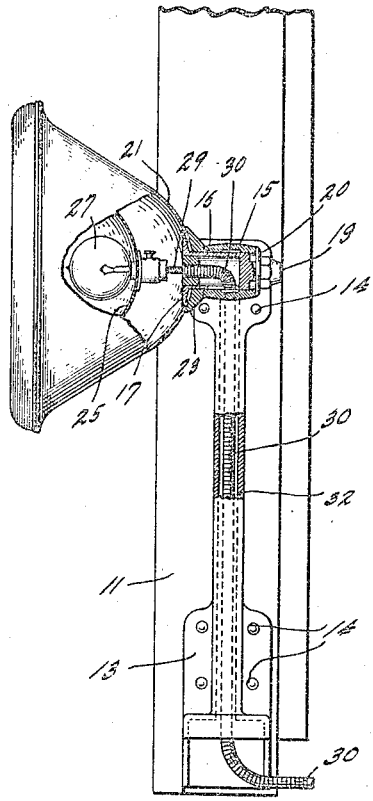
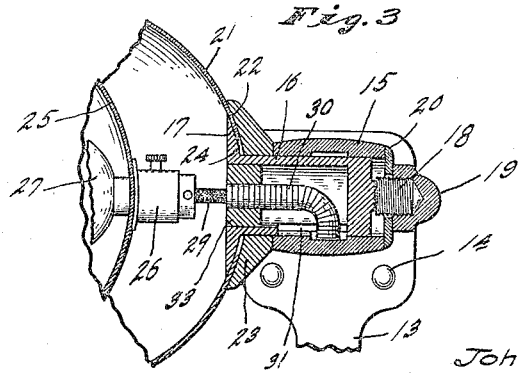
WITNESS
Frank A. Fahle
INVENTOR
John C. Moore,
BY
Hood & Schly
ATTORNEYS

UNITED STATES PATENT OFFICE.

JOHN C. MOORE, OF CONNERSVILLE, INDIANA.

AUTOMOBILE-HEADLIGHT AND MOUNTING THEREFOR.

1,195,383.  Specification of Letters Patent.  Patented Aug. 22, 1916.

Application filed August 25, 1915. Serial No. 47,346.

*To all whom it may concern:*

Be it known that I, JOHN C. MOORE, a citizen of the United States, residing at Connersville, in the county of Fayette and State of Indiana, have invented a new and useful Automobile-Headlight and Mounting Therefor, of which the following is a specification.

My invention relates to the mounting of automobile head lights.

The object of my invention is to provide a head light mounting which will hold the head light rigid, which will permit the ready adjustment of the headlight to throw the beam of light in the desired direction, and which is sightly in appearance.

The accompanying drawing illustrates my invention.

Figure 1 is a front elevation of a head-light mounting embodying my invention, showing the headlight, the headlight bracket, and a portion of the radiator; Fig. 2 is a side view of such headlight mounting, with some parts in section; and Fig. 3 is an enlarged section showing in detail the mounting of the headlight casing in the headlight bracket to provide the desired adjustment.

The radiator 10 at the front end of the automobile hood is of any desired type, and is mounted in any desired frame 11 supported in any usual manner by the main frame 12. A head lamp bracket 13 is fastened to each side of the radiator frame 11, as by rivets 14 near the top and bottom of such bracket, and is provided near the top with a laterally projecting short hollow arm 15 which at its outer end is drilled horizontally to receive a hollow bolt 16 having a head 17 at its forward end and being provided with a screw thread 18 at its rear end to receive a nut 19 which coöperates with a washer 20 to tighten the bolt 16. The rear side of the head 17 is curved to fit against the inside surface of a curved casing 21 of a headlight, and force the outer rear surface of such casing against a correspondingly curved concave face 22 on the front of a washer 23 located between such casing and the front face of the drilled portion of the arm 15. The rear of the headlight casing 21 is provided with a hole 24 which is larger than the shank of the bolt 16, so as to allow such shank to project freely through it and to allow the casing 21 to be moved on the surface 22. Within the casing 21 is mounted the reflector 25, usually parabolic in shape, and on the rear of this reflector is a suitable lamp socket 26 which supports a lamp bulb 27 at the focus of such reflector. At the front of the headlight is the usual glass disk 28. From the socket 26 a lamp cord 29, preferably provided with a flexible armor 30, extends through the hollow bolt 16, through a slot 31 in the side of such bolt, through the hollow arm 15, and through a channel 32 formed in the bracket 13, and projects below the top of the frame 12. The slot 31 is sufficiently large so that its sides will not interfere with the cable 29 as the bolt 16 is adjusted. The armored cable 29 is preferably supported at the front of the cable 30 by a washer 33, to prevent chafing.

By having the bracket 13 rigidly fastened to the radiator frame 11, the vibration of the bracket and the head light are almost wholly eliminated. By loosening the nut 19 the clamping action of the head 17 and the washer 23 on the headlight casing 21 is relieved, and the headlight casing may be slid along the curved surface 22 to adjust the direction in which the headlight throws its beam of light. When the desired adjustment is obtained the nut 19 is tightened and the headlight firmly held in the adjusted position.

I claim as my invention:

1. In combination, an automobile radiator frame, a headlight bracket extending vertically along the side of such frame and rigidly attached thereto, said bracket having a short lateral arm in its upper end, and a forwardly projecting headlight mounted on the outer end of said short arm.

2. In combination, an automobile radiator frame, a headlight bracket extending vertically along the side of such frame and rigidly attached thereto, and a headlight mounted in the upper end of said bracket.

3. In combination, a headlight bracket rigidly fastened to the side of an automobile radiator frame, said bracket being provided with a forwardly directed opening through it and also being provided with a wire channel extending along its body and communicating with said opening, a hollow bolt in said opening, said bolt having a lateral opening in its shank to provide a connection between its interior and said wire channel, and a headlight having a casing provided at its rear with a hole through which the shank of said bolt extends, said hole being larger than said shank and the head of the bolt being within said casing, so that the tightening of the bolt clamps the headlight casing between the bolt head and the front face of the bracket.

4. In combination, a headlight bracket, said bracket being provided with a forwardly directed opening through it and also being provided with a wire channel extending along its body and communicating with said opening, a hollow bolt in said opening, said bolt having a lateral opening in its shank to provide a connection between its interior and said wire channel and also having its head coöperating with the front face of the bracket to form a clamp for a headlight.

5. In combination, a headlight support, said support being provided with a forwardly directed opening through it, a bolt in said opening, and a headlight having a casing provided at its rear with a hole through which the shank of said bolt extends, said hole being materially larger than said shank and the head of the bolt being within said casing, so that the tightening of the bolt clamps the headlight casing between the bolt head and the front face of the support and the loosening of the bolt permits adjustment of the headlight.

6. In combination, a headlight bracket, said bracket being provided with a forwardly directed opening through it and also being provided with a wire channel extending along its body and communicating with said opening, a hollow bolt in said opening, said bolt having a lateral opening in its shank to provide a connection between its interior and said wire channel, and a headlight having a casing provided at its rear with a hole through which the shank of said bolt extends, said hole being larger than said shank and the head of the bolt being within said casing, so that the tightening of the bolt clamps the headlight casing between the bolt head and the front face of the bracket.

7. In combination, a headlight support, said support being provided with a forwardly directed opening through it, a bolt in said opening, a headlight having a casing provided at its rear with a hole through which the shank of said bolt extends, said hole being materially larger than said shank and the head of the bolt being within said casing, so that the tightening of the bolt clamps the headlight casing between the bolt head and the front face of the support, the rear of said headlight casing being curved, and the rear face of the bolt head and a forwardly directed face on a part rigid with the support being similarly curved to coöperate with the interior and exterior faces of said headlight casing, so that upon the loosening of the bolt the headlight may be adjusted on said curved surfaces to adjust the direction in which the light from the headlight is thrown.

8. In combination, a headlight bracket, said bracket being provided with a forwardly directed opening through it and also being provided with a wire channel extending along its body and communicating with said opening, a hollow bolt in said opening, said bolt having a lateral opening in its shank to provide a connection between its interior and said wire channel, a headlight having a casing provided at its rear with a hole through which the shank of said bolt extends, said hole being larger than said shank and the head of the bolt being within said casing, so that the tightening of the bolt clamps the headlight casing between the bolt head and the front face of the bracket, said headlight also having a reflector and a lamp bulb mounted at the focus of said reflector, and a wire leading from the mounting for said lamp bulb through said hollow bolt, said lateral opening in said bolt, and said wire channel.

9. In combination, a headlight bracket for automobiles, comprising a body portion provided with means for attaching it to an automobile radiator, and a laterally projecting arm at its upper end for supporting the headlight, a hollow stud for carrying a headlight, said stud having a lateral opening from the space within it, said arm being perforated to receive said stud and said body portion and arm being provided with a channel communicating laterally with the perforation in said arm and opening.

In witness whereof, I have hereunto set my hand at Connersville, Indiana, this 21st day of August, A. D. one thousand nine hundred and fifteen.

JOHN C. MOORE.